W. M. THOMAS.
INTERMITTENT MOTION FOR MOVING PICTURES.
APPLICATION FILED OCT. 14, 1915.

1,244,919.

Patented Oct. 30, 1917.
4 SHEETS—SHEET 1.

INVENTOR,
William M. Thomas,
BY
James P. Duhamel,
ATTORNEY.

W. M. THOMAS.
INTERMITTENT MOTION FOR MOVING PICTURES.
APPLICATION FILED OCT. 14, 1915.

1,244,919.

Patented Oct. 30, 1917.
4 SHEETS—SHEET 2.

INVENTOR
William M. Thomas,
BY
James P. Duhamel,
ATTORNEY

W. M. THOMAS.
INTERMITTENT MOTION FOR MOVING PICTURES.
APPLICATION FILED OCT. 14, 1915.
1,244,919.
Patented Oct. 30, 1917.
4 SHEETS—SHEET 3.
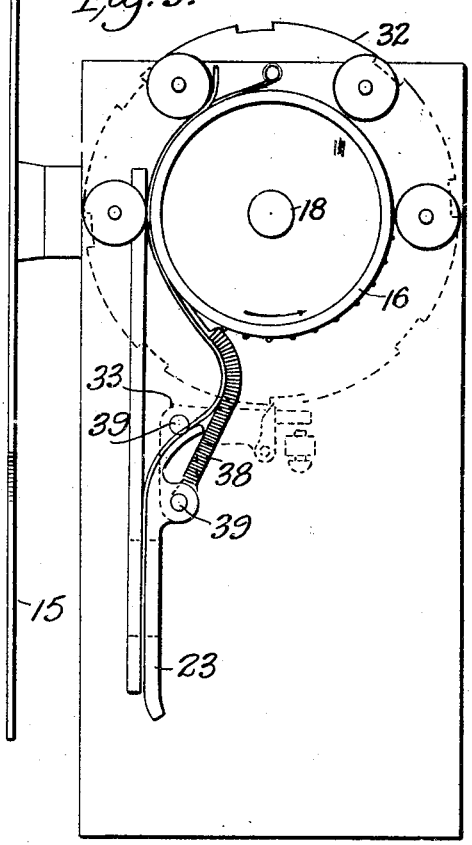
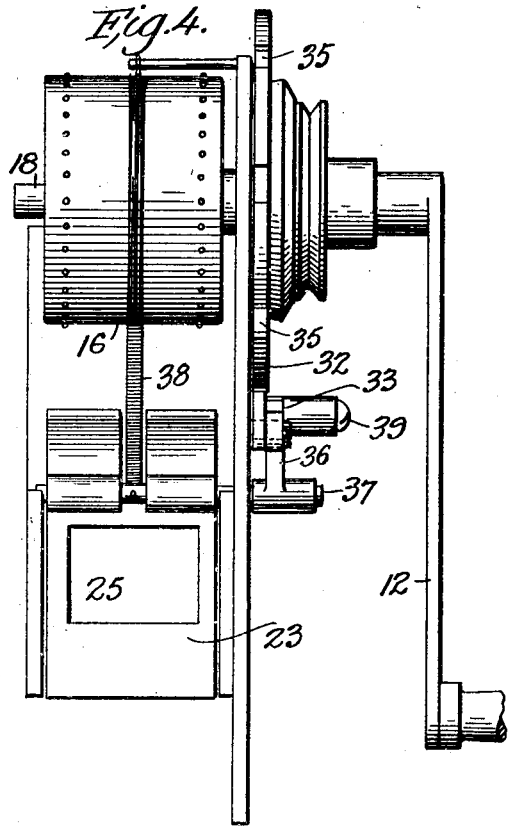
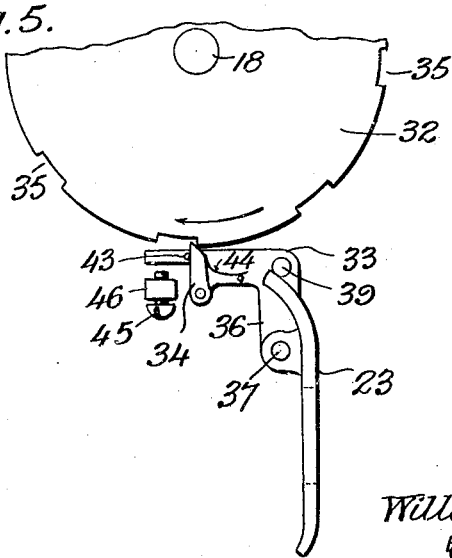
INVENTOR.
William M. Thomas,
By James P. Duhamel
ATTORNEY W. M. THOMAS.
INTERMITTENT MOTION FOR MOVING PICTURES.
APPLICATION FILED OCT. 14, 1915.
1,244,919.
Patented Oct. 30, 1917.
4 SHEETS—SHEET 4.
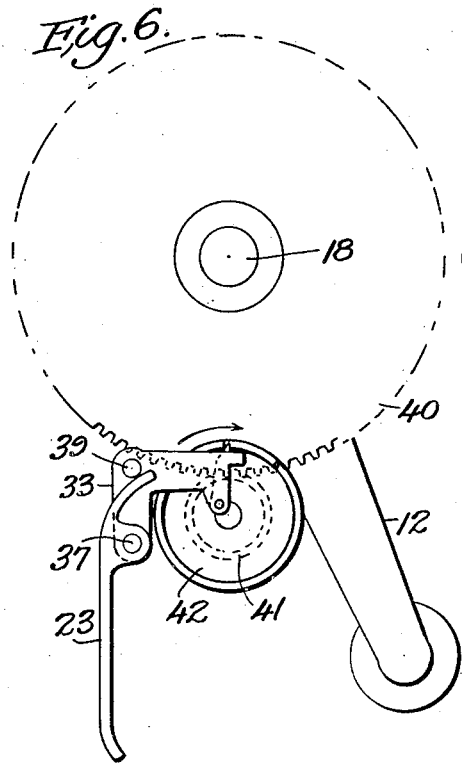
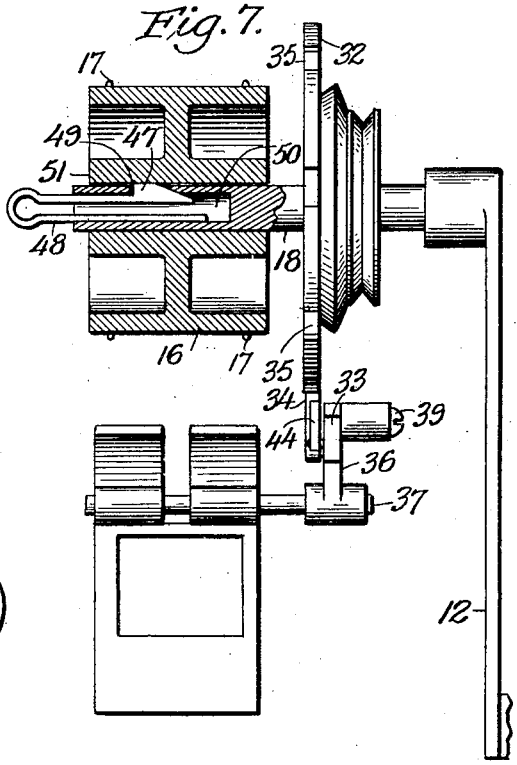
INVENTOR,
William M. Thomas,
BY
James F. Duhamel,
ATTORNEY

UNITED STATES PATENT OFFICE.

WILLIAM M. THOMAS, OF NEW YORK, N. Y., ASSIGNOR, BY MESNE ASSIGNMENTS, TO THOMAS-OBERKIRCH COMPANY, LIMITED, OF NEW YORK, N. Y., A CORPORATION OF NEW YORK.

INTERMITTENT MOTION FOR MOVING PICTURES.

1,244,919.  Specification of Letters Patent.  Patented Oct. 30, 1917.

Application filed October 14, 1915. Serial No. 55,875.

*To all whom it may concern:*

Be it known that I, WILLIAM M. THOMAS, a citizen of the United States, and resident of New York, in the county of New York and State of New York, have invented certain new and useful Improvements in Intermittent Motions for Moving Pictures, of which the following is a specification.

This invention relates to moving picture apparatus and more especially to means for producing intermittent motion, the object of the invention being to feed a translucent tape containing pictures continuously but to check and lock the same for the projection of a picture while the tape is being fed and a loop formed. The resiliency of the tape at the loop will cause the said tape to instantly shoot forward when released and the succeeding picture to take its place for projection and detention. These and other objects and details of the invention will be more fully described in the following specification, set forth in the claims and illustrated in the accompanying drawings, wherein:

Fig. 3, is a sectional view of part of a camera or projector showing a modified form of clamp or arrester.

Fig. 4, is a rear view of the same.

Fig. 5, is a detail view.

Fig. 6, is another modified form.

Fig. 7, shows an adjusting means for the feed roller.

Figure 1:
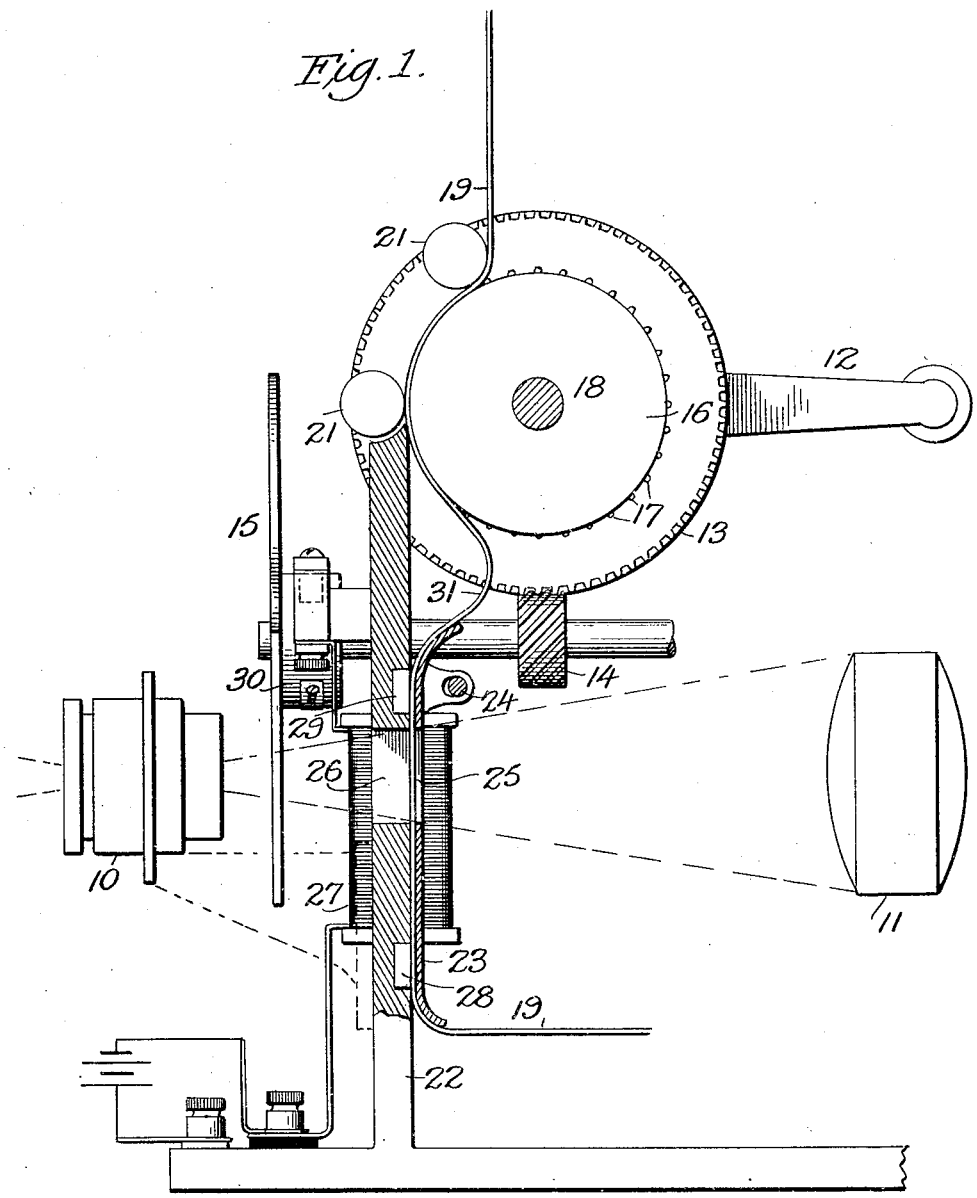
Figure 1, is a vertical sectional view through so much of a camera or projector as is necessary to show the invention.

In the use of translucent picture films the feed of the same by means of perforations has been found to be indispensable because the adjustment must be perfect and the use of friction feed rollers permits of inequalities of movement that results in the total impossibility of registering the pictures to be projected before the opening in the shutter. The use of the perforations however has heretofore precluded rapid speed in the movement of the film becaues the intermittent movement of the feed roller with its teeth engaging the perforations is apt to tear them out and consequently destroy the film.

The present invention is designed to overcome this serious objection and the continuous feed provided does not subject the brittle film to the jerking action of feed teeth when dragged but causes the film to store up sufficient energy to intermittently spring into position where it is held while the shutter is open and repeats the operation while the shutter is closed.

The camera or projector is of the ordinary type, having lenses 10 and 11, a handle and crank arm 12, the worm wheel 13, the worm 14 and the shutter 15. A feed roller 16 with teeth 17 is also provided and is mounted on the shaft 18 to be rotated by the handle 12 so as to feed the picture film 19. The film has the usual perforations 20 for that purpose and is carried on reels in the ordinary manner which is not shown in the drawings.

After passing the feed roller and its idlers 21 the film passes downward between the front wall 22 of the camera and the clamp 23 which is adapted to swing on a shaft 24 supported in the side walls. The clamp, in this form of the invention is necessarily of iron and it has an opening 25 coinciding with the opening 26 in the wall 22.

At the outside of the camera box is an electro-magnet 27 whose poles 28 and 29 are fitted in the wall 22 and opposite each end of the clamp 23, while the circuit of the electro-magnet embraces a commutator 30 on the shutter shaft so that during a part of the rotation of the shutter and during the period when the same is open and the picture exposed, the circuit is closed and the magnet and its poles are energized. The iron clamp 23 is consequently attracted to the poles and held fast, gripping the film 19 whose movement is arrested.

Notwithstanding the detention of the film at the openings 25 and 26 the roller 16 continues to feed and a loop 31 is formed between the clamp and the roller 16 which in consequence of the highly resilient nature of the celluloid of which the film is made, means the storing up of considerable energy to be exerted when the clamp is released. The length of material in the loop is carefully regulated to equal the length of one of the pictures to be projected and on the release of the clamp the film springs forward and presents another picture of the series to the openings.

While the above description covers electrically operated means for feeding an intermittent picture film in the remaining views of the drawings is shown how the same act may be performed mechanically. The shaft 18 is in this case provided at the outside of the box with a notched wheel 32 and beneath the same is pivoted a bell crank lever 33, one end carrying a detent 34 whose end is adapted to slide over the edge of the wheel 32 or to enter one of the notches 35. On the lower end of the arm 36 of the lever 33 is carried the shaft 37 of the clamp 23. When the detent is riding on the edge of the wheel the clamp is forced in toward the wall of the box, gripping the film and when a notch is reached which the detent enters the clamp is loosened and the loop forces the effective portion of the film before the exposure opening to spring downward. In order to facilitate the action of the loop a spring 38 may be secured to the shaft 39 and its end run around the feed roller 16 in a groove and secured where desired. When the loop causes the spring to take the shape shown in Fig. 3 the tension of the latter will assist the film in its downward movement.

The modified form shown in Fig. 6, provides for a more delicate operation of the clamp since the notched wheel may vary, though slightly, in its effect on the detent. The larger notched wheel is in this case dispensed with and a gear wheel 40 is instead mounted on the shaft 18 and meshes with a pinion 41 carrying with it the small single notched wheel 42, while as above described the larger wheel had eight notches, and operated the detent eight times in one rotation, the picture was necessarily exposed a shorter time in proportion to its rest. By the use of the smaller wheel 42 it is rotated eight times to the single rotation of the wheel 40 and at the same time lost motion and inequalities of movement are reduced one eighth. The detent 33 is limited in one direction by the pin 43 and pressed forward by a spring 44 while the pressure of the clamp on the film is regulated by the set screw 45 working in a bracket 46.

The feed roller 18 may be delicately adjusted by means of the wedge 47 at one end of the spring 48 as shown in Fig. 7. The wedge plays in a slot 49 at one side of the socket 50 and presses against the inside of the hub, 5, connecting the shaft 18 with the wheel but if necessary to turn the wheel slightly, a little force may rotate it the desired extent, or if the spring 48 is too strong it may be driven in the socket and the inclined face of the wedge releases it from engagement with the hub.

Figure 2:
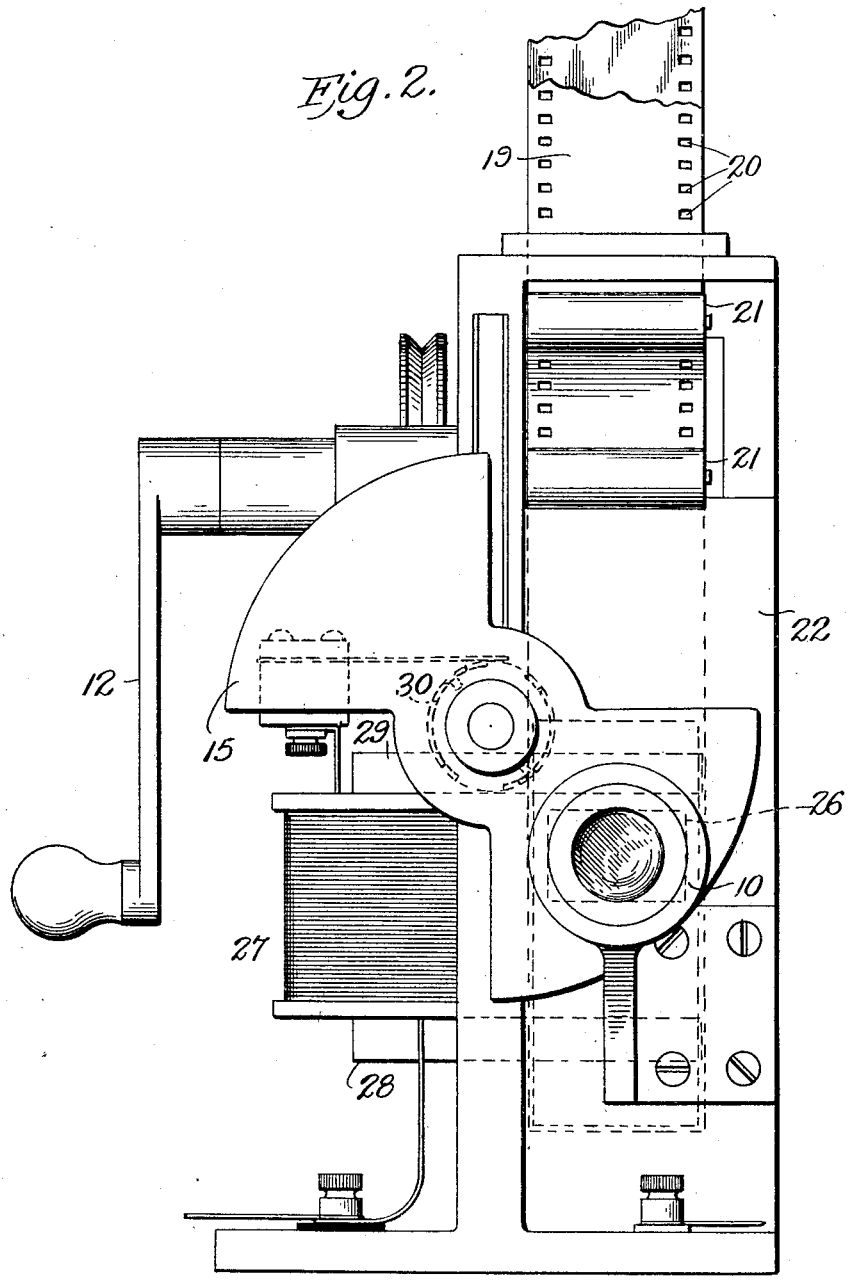
Fig. 2, is a front view of the same.

The feeding of the film is thus accomplished by using the perforations with the constantly feeding in sprocket and feeding out sprocket. The intermittent movement and spacing is done by the clamp with flat surfaces and perforations are not employed. Because of the fact that the intermittent movement of the film adjacent the exposure opening is accomplished by latent energy stored within the film and permitted to become potential energy adapted to move the film, extremely high speed of movement is obtained without jerking the film by means of projections extending through the perforations. By the present invention it is possible to intermittently move the film in a less period of time than has heretofore been possible. This fact enables a longer portion of the individual picture interval to be devoted to exposing the film before the exposure opening. This has the advantage of permitting a greater amount of light activity where the invention is used in a camera and also has the advantage of permitting a longer projection where the invention is used in connection with a projector. In this type of invention the movement of the film takes place in the same interval of time irrespective of the rate at which the individual pictures are made. The reason for this is because the intermittent movement does not begin until the clamp 23 releases the film and as soon as the film is released the loop straightens substantially instantaneously thereby moving the film past the exposure opening a distance equal to the amount of film accumulated in the loop. The number of pictures per second, however, is dependent on how many times per second the clamp 23 releases the film and this is dependent upon the rate of speed at which the effective mechanism is manipulated, for example, the number of times per second the commutator 30 (Figs. 1 and 2) is revolved, or the number of notches 35 per second (Figs. 3, 4 and 5) which engage the detent or dog 34.

This feed it is to be noted is extremely desirable in connection with demonstration work where it is often necessary to slow up the taking or projecting of the pictures, particularly projecting. By means of this construction where pictures are slowed up the moment of changing from one picture to another is the same for all speeds and the variation occurs entirely in the portion of the interval in which the individual picture is exposed before the exposure opening.

This machine accomplishes this, as the feed speed is constant for any motion of the machine. The dwell of the picture can be anything desired from one second to one minute, provided the film will stand the heat of the lamp, but the feeding will be instantaneous.

It will be understood that the natural spring of the film is sufficient to feed at the ordinary camera speed, but to obtain a higher rate of feeding speed, a spring or air, or other elastic mediums could be used to store up latent energy in a portion of the film and to impart potential energy to the moving of another portion of the film. Where a high rate of speed of feed is desired a nest-shaped loop having a plurality of individual convolutions may be used so that the simultaneous straightening of a plurality of the convolutions will give a relatively large movement of the film in an extremely short period of time.

It is obvious that other modifications may be resorted to and the parts otherwise arranged without departing from the essential features above described or the scope of the appended claims.

What I claim is:

1. In a moving picture instrument an intermittent feed comprising, in combination, means to hold a portion of film stationary, devices for feeding another portion of film to form a loop and to store up energy capable of moving the stationary portion of the film, means for releasing the stationary portion of the film and permitting the stored up energy to move the portion of film that was held stationary.

2. In a moving picture instrument, devices for producing an intermittent film feed and comprising, in combination, means for holding a portion of film stationary, means for continuously feeding an adjacent portion of film and storing energy capable when released of quickly moving the stationary part of the film, and means for releasing the energy to enable same to move the portion of film that was held stationary.

3. In a moving picture machine, devices for producing an intermittent feed of the film adjacent the exposure opening, said devices comprising, in combination, means for intermittently holding a portion of the film stationary adjacent the exposure opening, devices for accumulating a surplusage of film between said devices and the portion of film that is stationary, said devices being capable of storing energy in the accumulated portion of the film, means for releasing the film adjacent the exposure opening to permit the energy stored in the film to move the film a predetermined length.

4. In a moving picture machine, in combination, means to lock a portion of film adjacent the exposure opening, devices for forming a loop and storing energy in said loop capable of moving the film adjacent the exposure opening, and means for releasing the locked portion of the film to cause said energy to quickly move the last mentioned portion of the film a predetermined distance.

5. In a moving picture instrument, in combination, means to continuously move one portion of the film, devices to intermittently hold another portion of the film stationary, means adapted to store up energy from the continuously moving portion of the film while the stationary portion of the film is inactive, and means to release the stationary portion of the film to permit the energy stored to feed the film a picture length distance.

6. In a moving picture instrument, in combination, means to store latent energy in the film and devices to enable the latent energy to become potential energy for intermittently moving the film individual picture lengths.

7. In the moving picture art, mechanism for intermittently moving a portion of film, which mechanism comprises devices for storing latent energy in a portion of the film, and means intermittently causing the latent energy to become active potential energy capable of moving a predetermined portion of the film predetermined picture length intervals.

8. In a moving picture instrument, a lens, holding means for maintaining a portion of film stationary adjacent the focus of the lens, devices for feeding a predetermined picture length of film while the first mentioned portion is stationary, and means to cause the fed portion to push the first mentioned portion forward a predetermined picture length when the holding means is released.

9. In a moving picture instrument, a lens, holding devices to maintain an effective portion of film stationary in the focus of said lens, feeding means to feed another portion of the film a predetermined picture length and to store latent energy in the film while the effective portion is stationary, and means to release the effective portion when a picture length has been fed forward by the feeding means and to permit the latent energy to become potential energy for moving the said effective portion.

10. In a moving picture instrument, a lens, and holding means to intermittently hold a portion of film stationary in the focus of said lens, in combination with devices to form a loop in another portion of film and to store latent energy in said loop, and mechanisms to release said holding means when a predetermined amount of film has been formed into said loop to permit the said energy to quickly move predetermined portions of the film at the focus of the lens.

11. In a moving picture instrument, in combination, a suitable lens, holding means to maintain a portion of film intermittently locked stationary in the focus of said lens, devices for storing energy in another portion of the film, and mechanisms to intermittently render the holding means ineffective to permit the stored energy to move the portion of the film adjacent the focus of the lens a predetermined distance.

12. In a moving picture instrument, a lens, holding devices to hold an effective portion of the film in the focus of said lens for a predetermined interval, in combination with mechanism to form a loop in the film, means to store latent energy in said loop, and releasing means to render said holding devices periodically ineffective to permit the latent energy to become potential energy adaptable for moving the film adjacent the focus of the lens.

13. In a moving picture instrument, mechanism for moving the effective portion of the film suitable picture lengths, said mechanism comprising locking means to hold the effective portion of the film stationary, means for simultaneously storing energy in another portion of the film, and devices for releasing the locking means to permit the stored energy to move the effective portion a predetermined picture length.

Signed at New York, in the county of New York and State of New York, this 13th day of October, A. D. 1915.

WILLIAM M. THOMAS.

Copies of this patent may be obtained for five cents each, by addressing the "Commissioner of Patents, Washington, D. C."